US010141726B2

(12) United States Patent
Billett

(10) Patent No.: US 10,141,726 B2
(45) Date of Patent: Nov. 27, 2018

(54) MULTIPLE SOURCE GROUNDING FACILITATION SYSTEM

(71) Applicant: Jeffrey Billett, Punxsutawney, PA (US)

(72) Inventor: Jeffrey Billett, Punxsutawney, PA (US)

( * ) Notice: Subject to any disclaimer, the term of this patent is extended or adjusted under 35 U.S.C. 154(b) by 103 days.

(21) Appl. No.: 15/260,420

(22) Filed: Sep. 9, 2016

(65) Prior Publication Data

US 2018/0076602 A1 Mar. 15, 2018

(51) Int. Cl.
| | |
|---|---|
| *H01R 13/60* | (2006.01) |
| *H02G 3/02* | (2006.01) |
| *H01R 13/621* | (2006.01) |
| *H01R 13/648* | (2006.01) |
| *H01B 7/04* | (2006.01) |

(52) U.S. Cl.
CPC ............. *H02G 3/02* (2013.01); *H01B 7/04* (2013.01); *H01R 13/621* (2013.01); *H01R 13/648* (2013.01)

(58) Field of Classification Search
USPC ............................................................ 174/7
See application file for complete search history.

(56) References Cited

U.S. PATENT DOCUMENTS

| | | | | | |
|---|---|---|---|---|---|
| 3,172,510 | A | * | 3/1965 | Lee .......................... | H02G 11/02 191/12.2 A |
| 3,255,771 | A | * | 6/1966 | MacSpadden ............ | B64F 1/28 137/355.12 |
| 3,821,496 | A | * | 6/1974 | Malone .................... | A61B 5/04 191/12.2 R |
| 3,876,045 | A | * | 4/1975 | Knarreborg ............ | B65H 75/40 191/12.2 R |
| 3,887,254 | A | * | 6/1975 | Landis ..................... | H01R 4/64 439/35 |
| 3,920,308 | A | * | 11/1975 | Murray ................... | H02G 11/02 439/501 |
| 4,021,090 | A | * | 5/1977 | Fredericksen .......... | H01R 4/64 174/5 SG |
| 4,083,621 | A | * | 4/1978 | Davidson ............... | H02G 11/02 439/501 |
| 4,133,591 | A | * | 1/1979 | West ...................... | H01R 11/15 439/479 |
| 4,692,569 | A | * | 9/1987 | Winner .................... | B64F 1/34 191/12 R |
| 4,983,473 | A | * | 1/1991 | Smith ..................... | B60R 16/04 429/121 |
| 5,172,296 | A | | 12/1992 | Kaczmarek | |
| 5,358,068 | A | | 10/1994 | Whitmer | |
| 5,372,225 | A | * | 12/1994 | Joynes ................... | H02G 11/02 191/12.2 R |

(Continued)

*Primary Examiner* — William H Mayo, III
*Assistant Examiner* — Krystal Robinson

(57) ABSTRACT

A multiple source grounding facilitation system coordinates and facilitates electrical grounding of multiple sources. The system includes a frame and a primary grounding cable having a first end electrically coupled to the frame. A second end of the primary grounding cable is free for being grounded to earth. Each of a plurality of secondary grounding cables has a primary end electrically coupled to the frame such that each secondary grounding cable is electrically coupled to the primary grounding cable. Each secondary grounding cable has a distal end relative to the frame for coupling to a respective source wherein each source is grounded through the frame.

16 Claims, 6 Drawing Sheets

(56) References Cited

U.S. PATENT DOCUMENTS

| | | | | |
|---|---|---|---|---|
| 5,727,745 A * | 3/1998 | Vara | B65H 75/42 |
| | | | | 211/26 |
| 5,846,099 A | 12/1998 | Hiruma et al. | | |
| 5,913,487 A * | 6/1999 | Leatherman | H02G 11/02 |
| | | | | 191/12.2 R |
| 6,155,870 A * | 12/2000 | Valentine | H01M 2/1072 |
| | | | | 439/501 |
| 6,267,355 B1 * | 7/2001 | Fletcher | B65H 57/16 |
| | | | | 242/615 |
| 6,331,121 B1 * | 12/2001 | Raeford, Sr. | H01R 13/72 |
| | | | | 174/67 |
| 6,400,133 B1 * | 6/2002 | Vest | H01R 13/72 |
| | | | | 242/400 |
| 6,536,699 B2 * | 3/2003 | Glass | B65H 75/4476 |
| | | | | 242/400.1 |
| 6,600,426 B1 | 7/2003 | Sacks et al. | | |
| 6,969,275 B1 * | 11/2005 | Brock | H01R 13/60 |
| | | | | 439/502 |
| 7,454,829 B2 * | 11/2008 | Anderson | B65H 49/321 |
| | | | | 29/721 |
| 7,508,643 B2 | 3/2009 | Shreiner et al. | | |
| 7,518,058 B1 * | 4/2009 | Hagbrandt | H02G 3/02 |
| | | | | 174/113 C |
| D620,896 S | 8/2010 | Peterson | | |
| 2010/0197222 A1 * | 8/2010 | Scheucher | H01Q 9/30 |
| | | | | 455/11.1 |
| 2013/0139917 A1 * | 6/2013 | McAvey | F02M 37/0088 |
| | | | | 137/596.12 |
| 2014/0210399 A1 * | 7/2014 | Urschel | H02J 1/00 |
| | | | | 320/107 |

* cited by examiner

MULTIPLE SOURCE GROUNDING FACILITATION SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION (1) Field of the Invention (2) Description of Related Art including information disclosed under 37 CFR 1.97 and 1.98.

The disclosure and prior art relates to electrical grounding devices and more particularly pertains to a new electrical grounding device for coordinating and facilitating electrical grounding of multiple sources.

(h) BRIEF SUMMARY OF THE INVENTION

An embodiment of the disclosure meets the needs presented above by generally comprising a frame and a primary grounding cable having a first end electrically coupled to the frame. A second end of the primary grounding cable is free for being grounded to earth. Each of a plurality of secondary grounding cables has a primary end electrically coupled to the frame such that each secondary grounding cable is electrically coupled to the primary grounding cable. Each secondary grounding cable has a distal end relative to the frame for coupling to a respective source wherein each source is grounded through the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
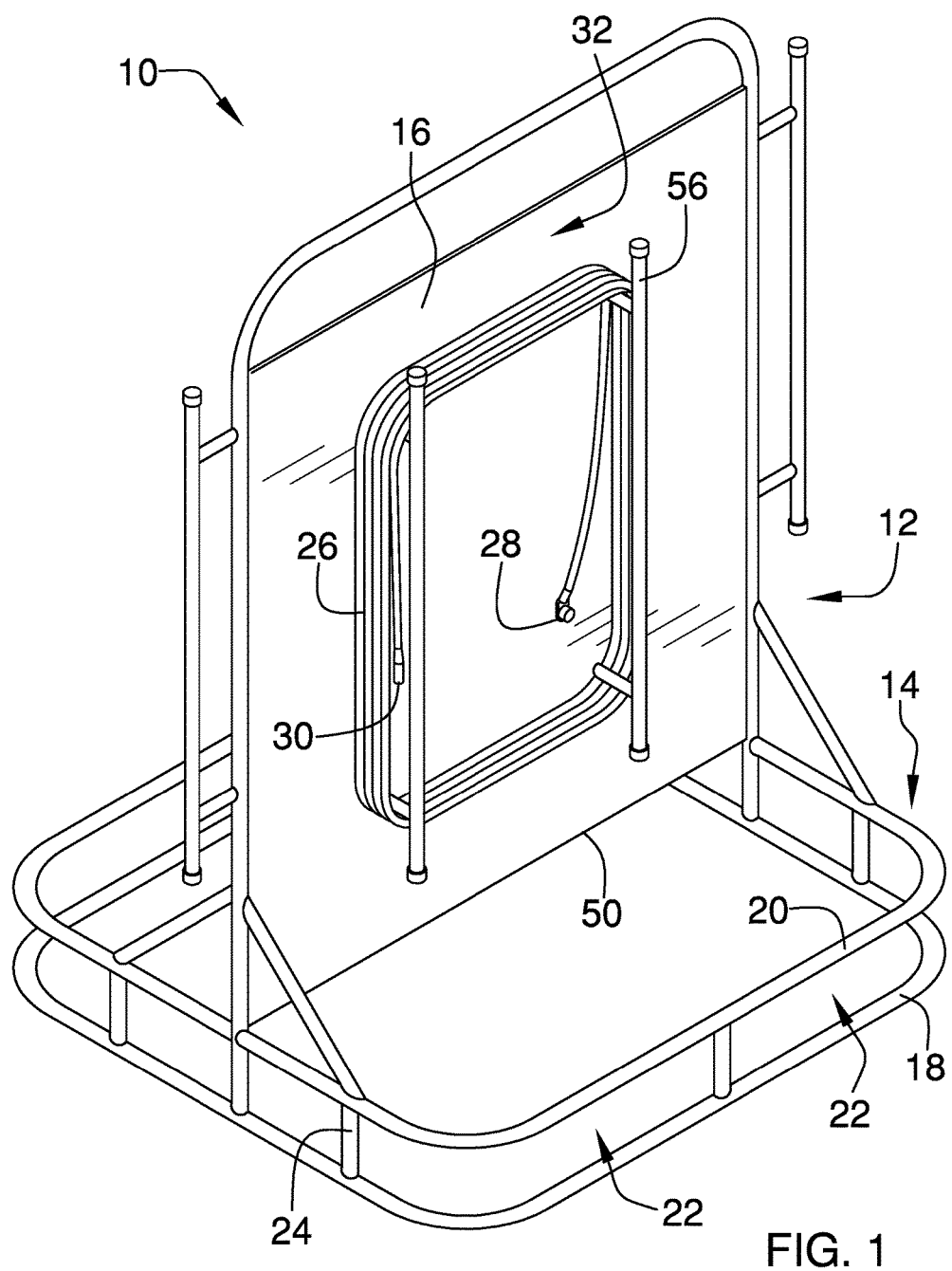
FIG. 1 is a front view of a multiple source grounding facilitation system according to an embodiment of the disclosure.
Figure 2:
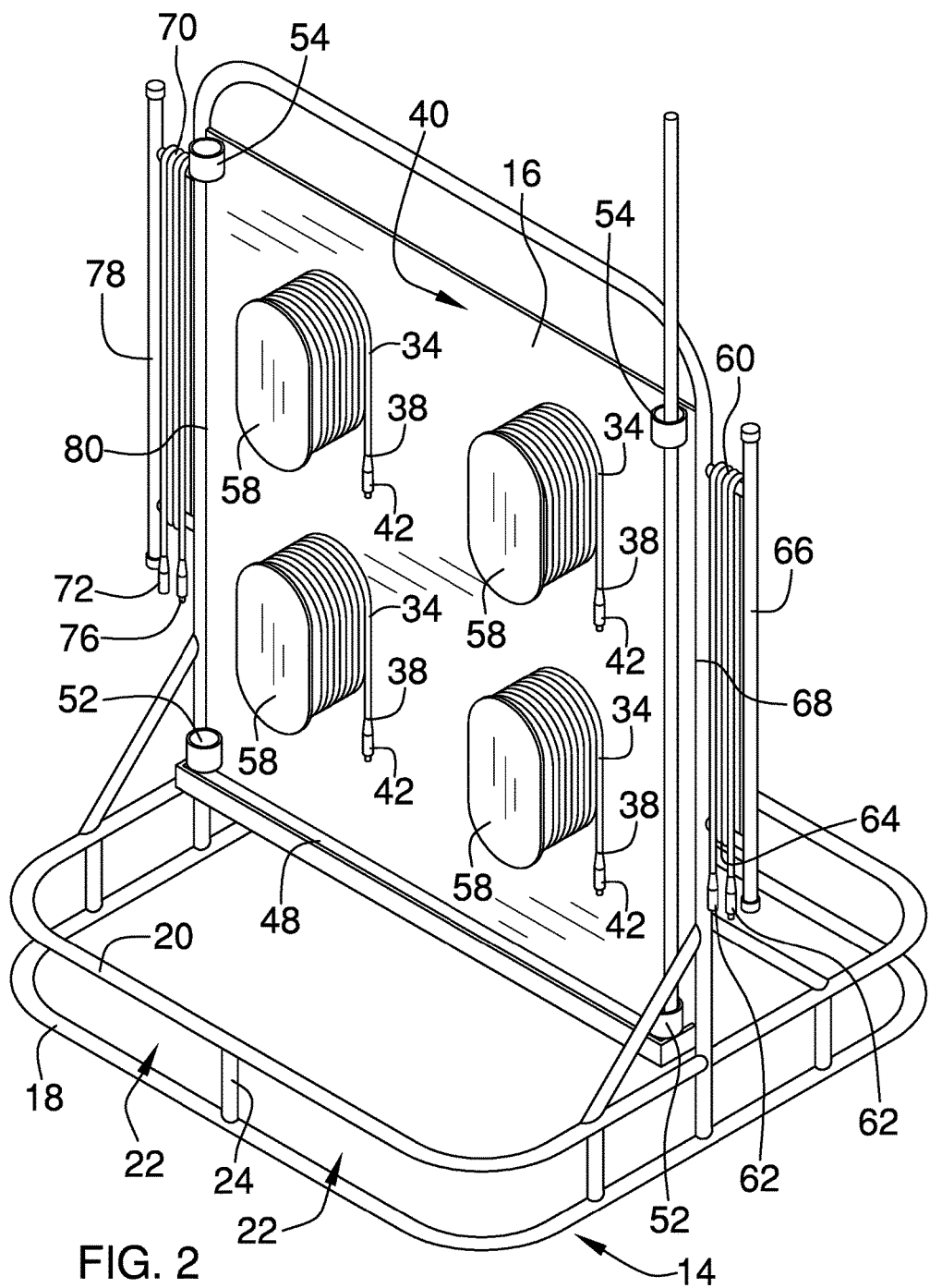
FIG. 2 is a back view of an embodiment of the disclosure.
Figure 3:
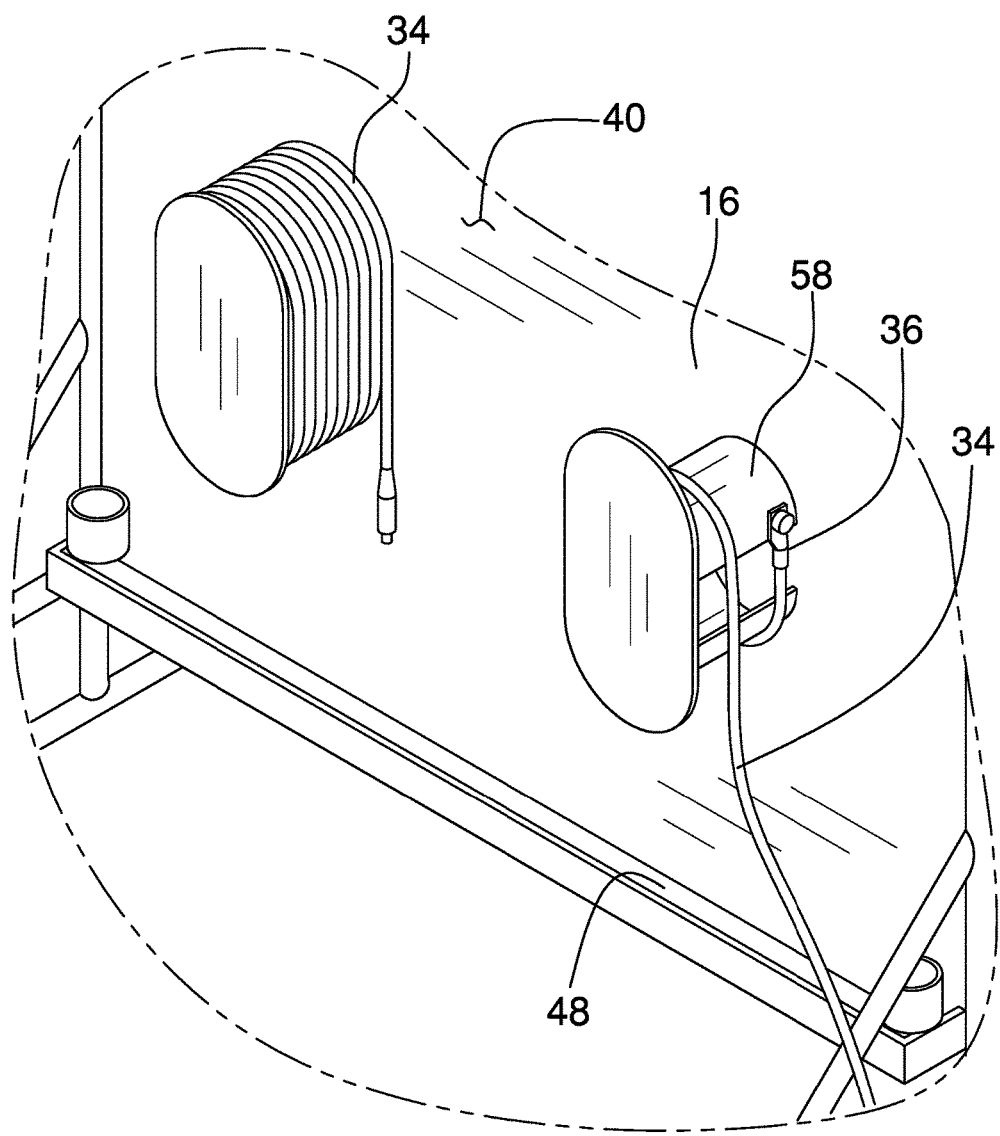
FIG. 3 is a detailed partial top back side view of an embodiment of the disclosure.
Figure 4:
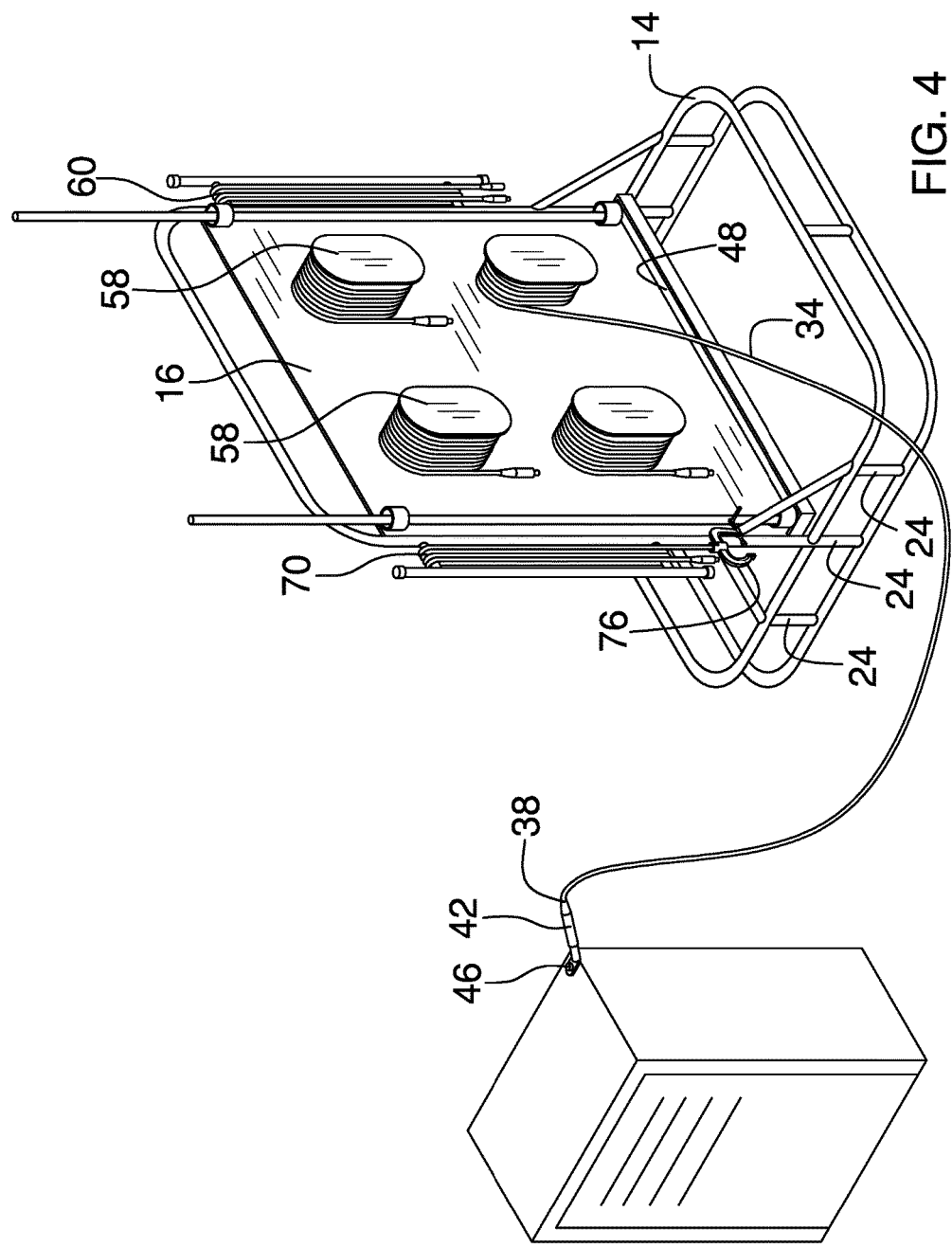
FIG. 4 is a top back side perspective view of an embodiment of the disclosure in use.
Figure 5:
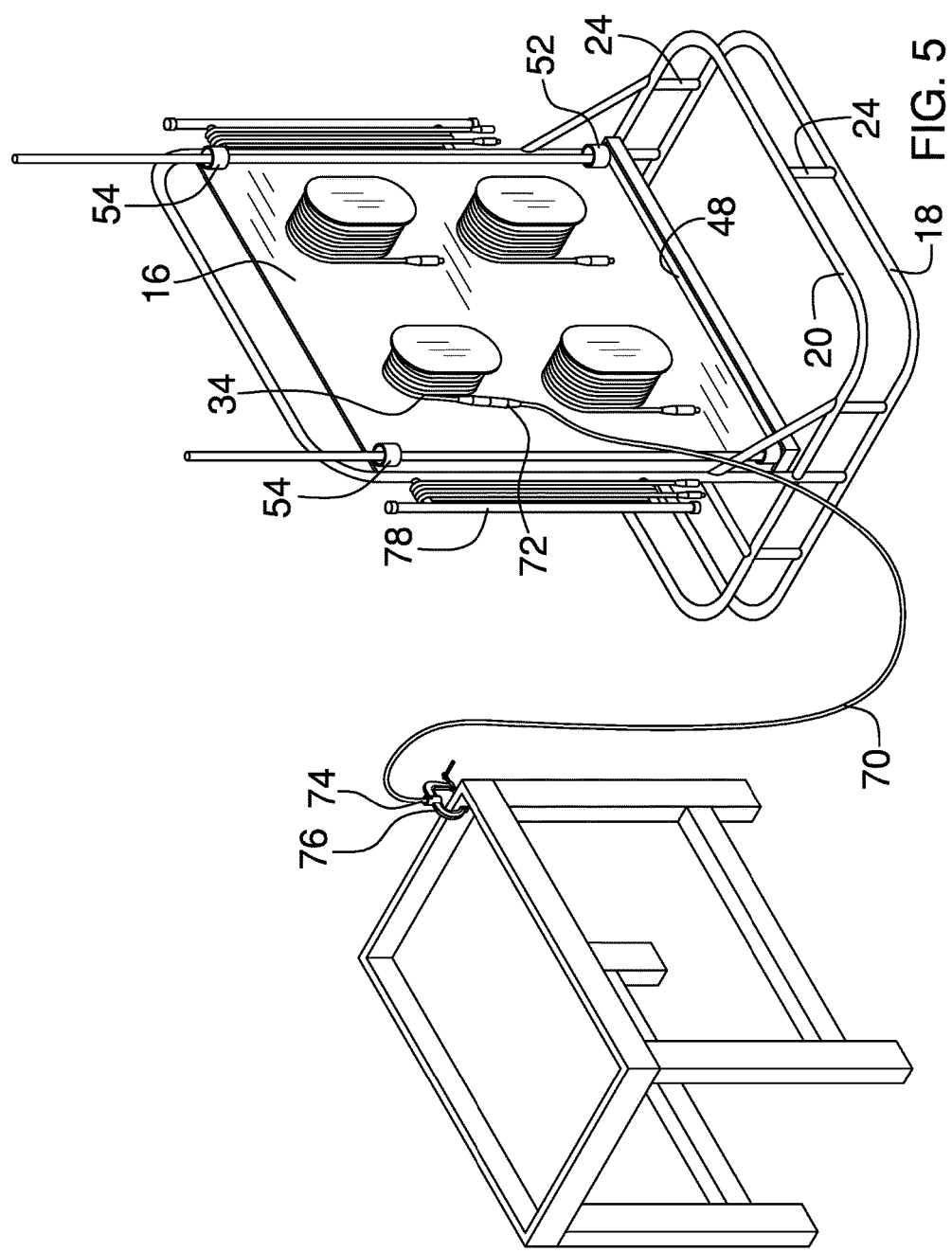
FIG. 5 is a top back side perspective view of an embodiment of the disclosure in use.
Figure 6:
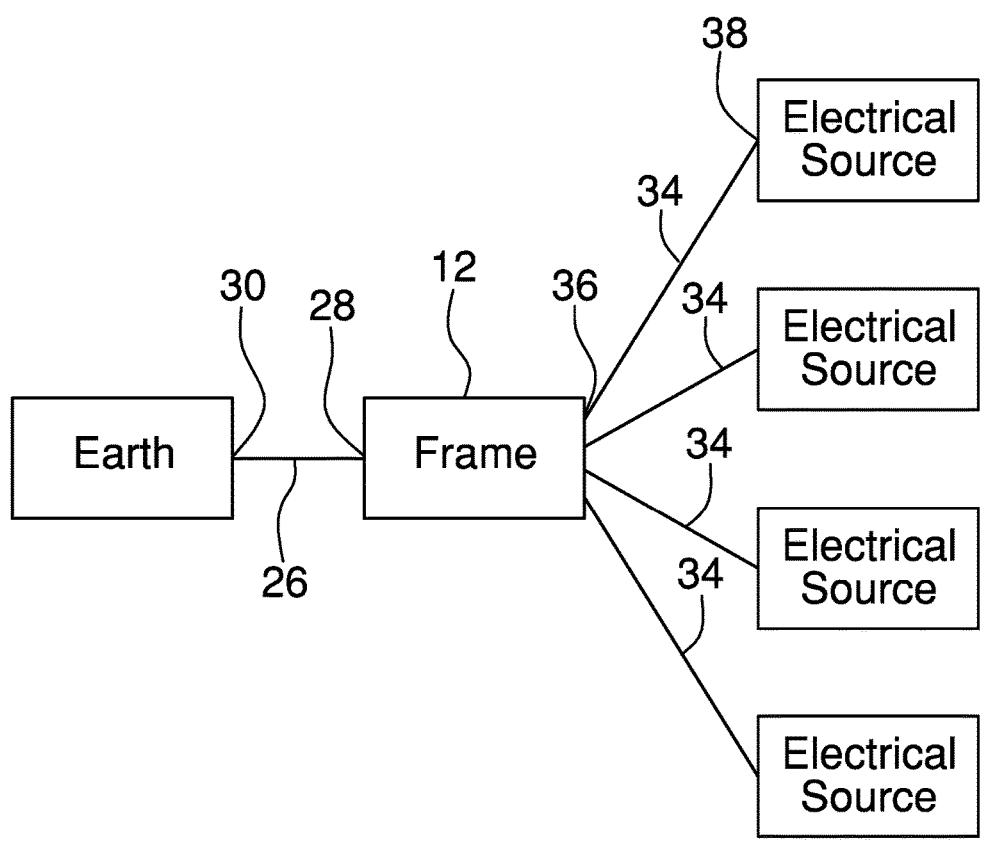
FIG. 6 is a schematic view of an embodiment of the disclosure.

With reference now to the drawings, and in particular to FIGS. 1 through 6 thereof, a new electrical grounding device embodying the principles and concepts of an embodiment of the disclosure and generally designated by the reference numeral 10 will be described.

As best illustrated in FIGS. 1 through 6, the multiple source grounding facilitation system 10 generally comprises a frame 12 including a base 14 and a panel 16. The panel 16 is coupled to and extends upwardly from the base 14. A bottom portion 18 of the base 14 is spaced from a top portion 20 of the base 14. Each of a plurality of slots 22 extends laterally into the base 14 wherein the base 14 is configured to facilitate lifting of the frame 12 using a skid loader, forklift, hand cart, or the like. The top portion 20 may also be grasped, or engaged by a strap, sling, chain, line, or the like to manually or mechanically lift, suspend, and/or move the frame 12 if desired. The base 14 includes a plurality of posts 24 extending between the bottom portion 18 of the base 14 and the top portion 20 of the base 14 wherein spaces between the posts 24 define the slots 22 extending laterally into the base 14. The frame 12 is constructed of a metal material or other material suitable for conducting unwanted currents and dissipating unwanted voltages.

A primary grounding cable 26 has a first end 28 mechanically and electrically coupled to the frame 12. The primary grounding cable 26 has a second end 30 which is free wherein the second end 30 of the primary grounding cable 26 is configured for being grounded to earth. Thus, the frame 12 provides a centralized grounding hub for items electrically coupled to the primary grounding cable 26 through the frame 12. The primary grounding cable 26 is positioned on a first side 32 of the panel 16. Each of a plurality of secondary grounding cables 34 has a primary end 36 electrically coupled to the frame 12 wherein each secondary grounding cable 34 is mechanically and electrically coupled to the primary grounding cable 26. Each secondary grounding cable 34 has a distal end 38 relative to the frame 12. Each distal end 38 is configured for coupling to a respective source to be grounded. Thus, each source is grounded through the frame 12. Each secondary grounding cable 34 is coupled to a second side 40 of the panel 16 opposite the first side 32. A respective quick connect connector 42 is coupled to the distal end 38 of each secondary grounding cable 34.

Complementary quick connect connectors 46 are electrically coupled to each source to facilitate grounding of each source by quick connection to respective secondary grounding cables 34.

A tray 48 is coupled to and extends from a bottom edge 50 of the panel 16. The tray 48 is used for holding connectors or other tools as may be desired. A lower sleeve 52 is coupled to the panel 16 proximate the bottom edge 50 and over the tray 48. An upper sleeve 54 is coupled to the panel 16 and vertically aligned with the lower sleeve 52. Thus, metal grounding electrodes such as grounding rods or the like may be inserted through the upper sleeve 54 and lower sleeve 52 to be and supported by the tray 48 to store the grounding electrodes on the frame 12.

A primary cable spool 56 is coupled to the first side 32 of the panel 16. The primary grounding cable 26 is wrappable around the primary cable spool 56 for storage of the primary grounding cable 26 on the frame 12. Similarly, each of a plurality of secondary cable spools 58 is coupled to the second side of the panel 40. Each secondary grounding cable 34 is wrappable around an associated one of the secondary cable spools 58 for storage of the secondary grounding cables 34 on the frame 12.

An extension cable 60 is also provided. The extension cable 60 has quick connection connectors 62 at opposite ends 64 of the extension cable 60. Thus, the extension cable 60 can be connected between a selectable one of the secondary grounding cables 34 and one of the sources to be grounded. An extension spool 66 is coupled to the frame 12 and positioned on a first lateral edge 68 of the panel 16. The extension cable 60 is wrappable around the extension spool 66 for storage of the extension cable 60 on the panel 16

A temporary grounding cable 70 has a cable connection end 72 couplable to the distal end 38 of a selectable one of the secondary grounding cables 34. A temporary connection end 74 of the temporary grounding cable 70 is coupled to a metal clamp 76 wherein the temporary grounding cable 70 is configured for electrically grounding temporary equipment by connection of the metal clamp 76 to the temporary equipment. A temporary grounding spool 78 is positioned on a second lateral edge 80 of the panel 16. The temporary grounding cable 70 is wrappable around the temporary grounding spool 78 for storage of the temporary grounding cable 70 on the panel.

In use, the system 10 provides a centralized hub in the frame 12 for grounding multiple sources of electrical current or voltage. The frame 12 is positioned in a desired location. The primary grounding cable 26 is grounded to earth. The system 10 can be utilized for work sites such as in the oil and gas industry. However, use is not limited as the system 10 may be equally useful for other applications such as but not limited to temporary carnival or festival sites, movie sets, temporary entertainment venues, or the like. Individual points of electrical power being provided can be commonly grounded through the frame 12 using the secondary grounding cables 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple source grounding system comprising:
    a frame, said frame having a base and a panel, said panel being coupled to and extending upwardly from said base;
    a primary grounding cable having a first end electrically coupled to said frame, said primary grounding cable having a second end, said second end of said primary grounding cable being free wherein said second end of said primary grounding cable is configured for being grounded to earth; and
    a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame; and
    a plurality of slots extending laterally into said base wherein said base is configured to facilitate lifting of said frame.

2. The system of claim 1, further comprising said primary grounding cable being positioned on a first side of said panel.

3. The system of claim 2, further comprising each said secondary grounding cable being coupled to a second side of said panel opposite said first side.

4. The system of claim 1, further comprising a respective quick connect connector being coupled to said distal end of each said secondary grounding cable.

5. The system of claim 1, further comprising a tray coupled to and extending from a bottom edge of said panel.

6. The system of claim 1 further comprising: a bottom portion of said base being spaced from a top portion of said base; and a plurality of electrodes extending between said bottom portion of said base and said top portion of said base wherein spaces between said electrodes define said slots extending laterally into said base.

7. The system of claim 1, further comprising a lower sleeve coupled to said panel proximate said bottom edge.

8. A multiple source grounding system comprising:
    a frame, said frame having a base and a panel, said panel being coupled to and extending upwardly from said base;
    a primary grounding cable having a first end electrically coupled to said frame, said primary grounding cable having a second end, said second end of said primary grounding cable being free wherein said second end of said primary grounding cable is configured for being grounded to earth;
    a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame;

a lower sleeve coupled to said panel proximate said bottom edge; and an upper sleeve coupled to said panel, said upper sleeve being vertically aligned with said lower sleeve.

9. The system of claim 1, a primary cable spool coupled to said first side of said panel, said primary grounding cable being wrappable around said primary cable spool for storage of said primary grounding cable on said frame.

10. A multiple source grounding system comprising:
a frame, said frame having a base and a panel, said panel being coupled to and extending upwardly from said base;
a primary grounding cable having a first end electrically coupled to said frame, said primary grounding cable having a second end, said second end of said primary grounding cable being free wherein said second end of said primary grounding cable is configured for being grounded to earth, said primary grounding cable being positioned on a first side of said panel;
a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame; and
a plurality of secondary cable spools, each said secondary cable spool being coupled to said second side of said panel, each said secondary grounding cable being wrappable around an associated one of said secondary cable spools for storage of said secondary grounding cables on said frame.

11. A multiple source grounding system comprising:
a frame, said frame having a base and a panel, said panel being coupled to and extending upwardly from said base;
a primary grounding cable having a first end electrically coupled to said frame, said primary grounding cable having a second end, said second end of said primary grounding cable being free wherein said second end of said primary grounding cable is configured for being grounded to earth;
a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame;
an extension cable; and
an extension spool coupled to said frame.

12. The system of claim 11, further comprising said extension spool being positioned on one of a first lateral edge of said panel and a second lateral edge of said panel.

13. The system of claim 11, further comprising said extension cable having quick connection connectors at opposite ends of said extension cable.

14. A multiple source grounding system comprising:
a frame;
a primary grounding cable having a first end electrically coupled to said frame, said primary grounding cable having a second end, said second end of said primary grounding cable being free wherein said second end of said primary grounding cable is configured for being grounded to earth;
a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame;
a temporary grounding cable, said temporary grounding cable having a cable connection end couplable to said distal end of a selectable one of said secondary grounding cables; and
a temporary connection end of said temporary grounding cable being coupled to a metal clamp wherein said temporary grounding cable is configured for electrically grounding temporary equipment.

15. The system of claim 14, further comprising a temporary grounding spool being positioned on one of a first lateral edge of said panel and a second lateral edge of said panel, temporary grounding cable being wrappable around said temporary grounding spool for storage of said temporary grounding cable.

16. A multiple source grounding system comprising:
a frame, said frame including a base and a panel, a bottom portion of said base being spaced from a top portion of said base, said panel being coupled to and extending upwardly from said base, a plurality of slots extending laterally into said base wherein said base is configured to facilitate lifting of said frame, said base including a plurality of electrodes extending between said bottom portion of said base and said top portion of said base wherein spaces between said electrodes define said slots extending laterally into said base;
a primary grounding cable having a first end electrically coupled to said frame, said primary grounding cable having a second end, said second end of said primary grounding cable being free wherein said second end of said primary grounding cable is configured for being grounded to earth, said primary grounding cable being positioned on a first side of said panel;
a plurality of secondary grounding cables, each secondary grounding cable having a primary end electrically coupled to said frame wherein each secondary grounding cable is electrically coupled to said primary grounding cable, each secondary grounding cable having a distal end relative to said frame, each said distal end being configured for coupling to a respective source wherein each said source is grounded through said frame, each said secondary grounding cable being coupled to a second side of said panel opposite said first side, a respective quick connect connector being coupled to said distal end of each said secondary grounding cable;
a tray coupled to and extending from a bottom edge of said panel;
a lower sleeve coupled to said panel proximate said bottom edge;

a upper sleeve coupled to said panel, said upper sleeve being vertically aligned with said lower sleeve;

a primary cable spool coupled to said first side of said panel, said primary grounding cable being wrappable around said primary cable spool for storage of said primary grounding cable on said frame;

a plurality of secondary cable spools, each said secondary cable spool being coupled to said second side of said panel, each said secondary grounding cable being wrappable around an associated one of said secondary cable spools for storage of said secondary grounding cables on said frame;

an extension cable, said extension cable having quick connection connectors at opposite ends of said extension cable;

an extension spool coupled to said frame, said extension spool being positioned on a first lateral edge of said panel;

a temporary grounding cable, said temporary grounding cable having a cable connection end couplable to said distal end of a selectable one of said secondary grounding cables;

a temporary connection end of said temporary grounding cable being coupled to a metal clamp wherein said temporary grounding cable is configured for electrically grounding temporary equipment; and a temporary grounding spool being positioned on a second lateral edge of said panel, temporary grounding cable being wrappable around said temporary grounding spool for storage of said temporary grounding cable.

* * * * *